Patented Dec. 8, 1942

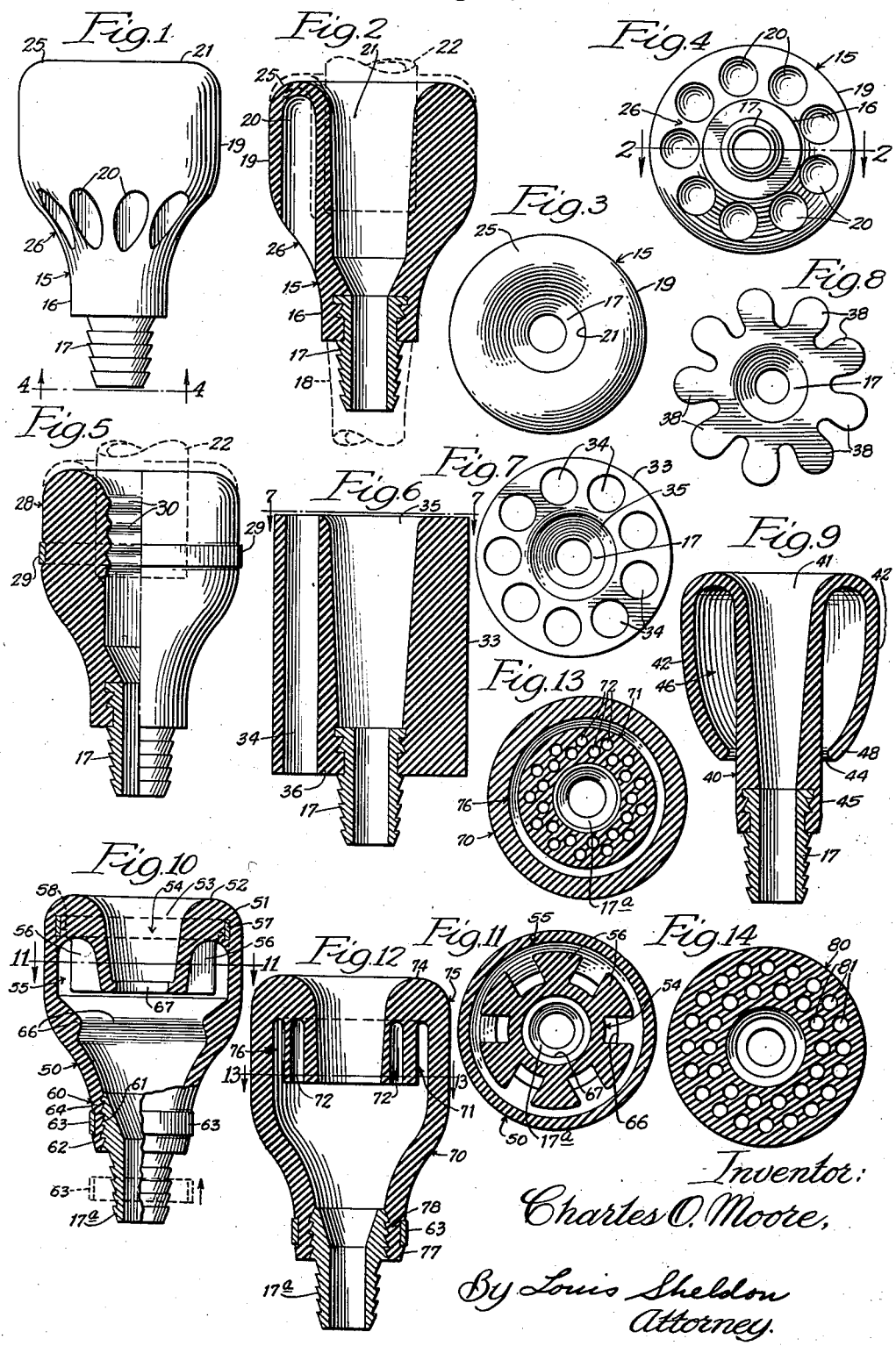

2,304,114

UNITED STATES PATENT OFFICE 2,304,114

FAUCET ATTACHMENT OR COUPLING

Charles O. Moore, Chicago, Ill.

Application August 25, 1939, Serial No. 291,943

5 Claims. (Cl. 285—90)

This invention relates to devices such as faucet attachments and flow couplings, although other uses may be found therefor as will be apparent to those skilled in the art.

Couplings and attachments of this general character have heretofore been found unsatisfactory because whenever there is any appreciable back pressure in the fluid issuing from the faucet or other conduit, such pressure causes the device to relinquish its grip.

It is accordingly an object of my invention to provide a device of this character which will retain its grip under back pressure conditions.

A further object is to provide a device of the character referred to adapted to grip faucet spouts and other tubular members of different diameters yet reinforced to withstand undesired distortion.

Further objects and advantages of the invention will appear as the description proceeds.

The invention will be better understood upon reference to the following description and accompanying drawing, in which:

Fig. 1 is an elevation of an attachment constructed in accordance with one form of my invention.

Fig. 2 is a longitudinal section taken as indicated by the line 2—2 in Figs. 3 and 4.

Figs. 3 and 4 are respectively top and bottom plan views of Fig. 1.

Fig. 5 is similar to Fig. 2 but shows another form of the invention.

Figs. 6 and 7 are similar to Figs. 2 and 3, respectively, but show a further modification.

Fig. 8 is a plan view of another modification.

Fig. 9 is a sectional view similar to Fig. 2 but of a further modification.

Fig. 10 is a longitudinal section of another modification.

Fig. 11 is a cross-section taken as indicated by the line 11—11 in Fig. 10.

Fig. 12 is a longitudinal section of still another modification.

Fig. 13 is a section taken as indicated by the line 13—13 in Fig. 12.

Fig. 14 is a sectional view similar to Fig. 13 but of an additional form of the invention.

The terms "upper" and "lower" are used herein not as words of limitation but merely for convenience in referring to parts of the construction.

The various forms are preferably made of pure gum, neoprene or other live rubber or rubberlike material.

Referring now more particularly to the drawing, one form of attachment is shown at 15. It comprises a lower tubular portion 16 which may be of substantially uniform diameter and may be made with a sawtooth interior to enable a nipple 17 or other member to be inserted and retained or the nipple may be molded in the material during the article forming molding operation. A rubber or other tube 18 may be detachably connected to the nipple as shown in dotted lines. The adapter 17 may be of metal, wood, hard rubber, "plastic" or other suitable material. The upper part of the attachment 15 is outwardly thickened or enlarged as shown at 19 and is preferably honeycombed or cellular, having holes 20 which increase the flexibility of the upper part of the attachment to such an extent as to enable the interior wall 21 thereof to expand to accommodate faucet spouts 22 and the like of different diameters, as shown in dotted lines in Fig. 4, the enlargement 19 being nevertheless sufficiently stiff to cause said interior wall to grip the spout to prevent leakage thereabove when back pressure results from a stoppage or partial stoppage of flow beyond the faucet, as for example when the outlet tube 18 is pinched. The holes 20 are preferably closed at the top 25 and open at the bottom 26 to enable the hole-forming mold pins (not shown) to be withdrawn. The bottom portion provides a shoulder against which the upper side of the thumb and forefinger embracing the relatively small lower portion of the device can apply upward pressure effectively in shoving the upper part of the device onto a tube or faucet spout, substantially no part of said pressure being radially inward. Thus said pressure does not substantially interfere with the fitting of the article on the spout. The upper wall 21 is preferably flared upward as at 31 to facilitate the attaching operation.

When the device is attached as to a faucet spout, the latter may substantially abut the nipple or be spaced therefrom as shown. The nipple, when molded or bonded to the attachment, so reinforces the attachment as to prevent expansion and hence loosening thereof on the spout as by back pressure of the fluid. It will be observed that substantially the entire distortion of the resilient material is at the inner portion thereof, so that the external appearance remains substantially unaltered, as shown in Fig. 2.

Instead of the cellular structure of Figs. 1 to 4, I may provide a relatively softer but solid body 28 adapted to expand internally to grip spouts and other tubes of different diameters. To prevent undue distortion of the exterior of the body and afford a measure of resistance to such expansion which may be equivalent to that inherent in the device of Figs. 1 to 4, I may secure a metal or other suitable band or ring 29 to the body 28, either by molding or in the manner described below with reference to the band 63. The bore of this device may be formed with annular ribs 30 for gripping the spout. The dotted lines show how the expansion to accommodate a spout 22 is effected without substantial distortion of the exterior of the body.

In the form shown in Figs. 6 and 7, I employ a cellular sleeve or tubing 33 whose cells 34 extend through the length of the attachment, the upper part 35 of the bore being preferably flared for facilitating securement to a faucet spout or the like. The lower end 36 may be roughened for the reception of a separate nipple 17 or the latter may be molded to the body. Here, also, expansion to accommodate a spout or the like does not distort the exterior of the article.

In Fig. 8 I have shown a device like that of Figs. 6 and 7 but fluted as at 38.

In accordance with the form appearing in Fig. 9, I provide a substantially uniform inner tube 40 flared upward near the top as at 41 and mushroomed outwardly to provide an outer sleeve 42 projecting downwardly and inwardly in spaced relation to said tube and terminating in a free edge 44 preferably above the bottom 45 of the tube. This edge is freely expansible to permit removal of the mold member forming the void or space 46. Thereafter said edge may be left as shown or integrally cemented or otherwise joined to the tube 40. This device is also capable of secure attachment to spouts etc. of different diameters, the lower part 48 of the outer sleeve 42 serving as a shoulder against which the thumb and forefinger embracing the lower part 45 of the tube may press as the device is applied to a spout or the like. The lower part 45 may be roughened to receive a separate nipple 17a or the latter may be molded to the lower part 45 as at 17.

In Figs. 10 and 11 I provide another form of attachment. It comprises an outer tubular member 50 having its upper end 51 connected at 52 to an end 53 of an inner tubular member 54. The members are spaced radially as at 55, and webs 56 at suitable angular intervals extend along and between the members and are integrally united to said inner member 54, said webs serving to stiffen said inner member so as to prevent said inner member from buckling, i. e., folding upon itself, away from the faucet, as it might otherwise do in the absence of adequate stiffening means. The members may be of the same thickness or the inner member may be thicker than the outer member, but it is preferred in any event that the inner member be sufficiently thin to enable it to expand substantially beyond its normal diameter to accommodate spouts of various diameters while enabling the attachment to tightly grip such spouts.

A preferably metallic ring 57 is molded in the resilient material as at the upper part of the attachment and is added in lieu of a relatively large amount of rubber to prevent unpuckering or ballooning of the inner sleeve and consequent relinquishment of its grip on the spout, without interfering with securement or intentional removal of the attachment. This unpuckering or ballooning is characterized by the expansion of the outer member or sleeve when not thus reinforced, forcing the upper end 53 of the inner member outward. The band 57 is completely encased in the material except at those points along its lower edge where it is supported by a mold member during the molding process. One such point is shown in dotted lines at 58.

The free end 60 of the outer member may be of any desired diameter to accommodate an adapter or nipple 17a of metal, hard rubber, resinous or other suitable material, or it may receive a conduit directly. Preferably, however, it is molded with a rough or sawtooth interior surface 61 and, after its separation from the mold apparatus, a nipple 17a is inserted into engagement with said surface, as shown. The exterior surface 62 of said free end 60 is preferably tapered inward and downward. A preferably metallic band 63 whose interior diameter may be slightly less than the diameter of the lower edge of the surface 62 is then worked onto said surface to substantially the extent shown, where it is tightly imbedded in the part 60. The surface 62 or the interior of the band may be soaped to facilitate the working on of the band. The portion of the rubber or the like at 64, between the band 63 and the nipple 17, is thus highly compressed so that it is practically rigid, so that it is practically impossible to pull the nipple out.

It will be noted that the webs 58 are independent of the outer sleeve 50, so that the latter does not restrict the flexing of the inner sleeve 54. The outer sleeve 50 is preferably of reduced diameter at its mouth to provide a shoulder 65 for facilitating attachment as is apparent from the foregoing description. The outer sleeve preferably has an interior boss 66 which may be continuous or interrupted and reinforces said sleeve so as to substantially prevent back pressure from unduly expanding the upper part of said sleeve. Said boss will however expand sufficiently to enable the device to be removed from the web-forming mold member (not shown).

The free end of the inner sleeve 54 may have an inwardly directed abutment or flange 67 to limit the extent of insertion of the faucet spout or other tube.

The article 70 shown in Figs. 12 and 13 may have substantially the same outward appearance as that of Figs. 10 and 11. It comprises an inner relatively short and thick sleeve 71 adapted to receive a faucet spout or the like which is cellular or honeycombed with one or more circumferential series of cells or holes 72, providing increased flexibility and adequate stiffness as in the construction of the enlarged portion in Figs. 1 to 4. The holes are preferably closed at the top 74, where the inner sleeve 71 is joined to an outer relatively long sleeve 75 preferably spaced annularly as at 76 from the inner sleeve. This device may be provided with a reinforcing band 57, a nipple 17a, band 63, etc., as explained above in connection with Figs. 10 and 11. The mouths of Figs. 10 to 13 are shown as of reduced size, but obviously may be of any size.

Fig. 14 shows a construction which may be similar to that of Figs. 12 and 13 except that the annular space is avoided, the inner and outer sleeves being one as shown at 80 and cellular or honeycombed to provide one or more series of holes 81 for the purpose described.

It is apparent from the foregoing that I have provided a neat attachment which may be molded complete in one piece, whether with or without a nipple or the like, the piece being constructed to yield and accommodate itself to spouts, tubes and the like of various diameters and securely retain its grip thereon despite back pressures.

Various modifications may suggest themselves to those skilled in the art without departing from the spirit of my invention, and, hence, I do not wish to be restricted to the specific form shown or uses mentioned, except to the extent indicated in the appended claims, which are to be interpreted as broadly as the state of the art will permit.

I claim:

1. A device of the class described, comprising a resilient soft rubber element having an inner relatively short faucet-receiving sleeve and an outer relatively long sleeve integrally connected at one end to an end of said inner sleeve, and spaced throughout from said inner sleeve, said inner sleeve being of gradually reduced inside diameter from the connected end thereof toward the free end thereof and having an inwardly projecting flange at the free end thereof, said inner sleeve having circumferentially spaced external ribs substantially throughout the length thereof, said ribs being of such cross-sectional form as to prevent buckling of said inner sleeve and being spaced from said outer sleeve in order not to interfere with expansion of said inner sleeve by an inserted faucet.

2. A device of the class described, comprising a resilient soft rubber element having an inner relatively short faucet-receiving sleeve and an outer relatively long sleeve integrally connected at one end to an end of said inner sleeve, and spaced throughout from said inner sleeve, said inner sleeve being of gradually reduced inside diameter from the connected end thereof toward the free end thereof and having an inwardly projecting flange at the free end thereof, said inner sleeve having circumferentially spaced external ribs substantially throughout the length thereof, said ribs being of such cross-sectional form as to prevent buckling of said inner sleeve and being spaced from said outer sleeve in order not to interfere with expansion of said inner sleeve by an inserted faucet, a relatively rigid adapter embraced by the free end of said outer sleeve and interlocked therewith in a substantially circumferential tongue-and-groove relation, and an endless relatively rigid band encircling the tongue-and-groove portions and maintaining said portion of said free end under such compression that said portion of said free end is substantially rigid so that it cannot yield sufficiently to permit said adapter to be withdrawn from said free end.

3. A device of the class described, comprising a resilient element having an inner faucet gripping sleeve and a spaced, connected outer sleeve having a tube receiving portion independent of said inner sleeve, said inner sleeve being expansible by a faucet entering the same without substantial interference from said outer sleeve, and a relatively rigid endless band fixedly embedded entirely within said element at the upper end of said inner sleeve for preventing expansion of the outer sleeve due to back pressure of the fluid from pulling the upper end of the inner sleeve away from the faucet.

4. A device of the class described, comprising a resilient soft rubber element having an inner relatively short faucet-receiving sleeve and an outer relatively long sleeve integrally connected at one end to an end of said inner sleeve, and spaced throughout from said inner sleeve, said inner sleeve having an inwardly projecting flange at the free end thereof, said inner sleeve having circumferentially spaced external ribs substantially throughout the length thereof, said ribs being of such cross-sectional form as to prevent buckling of said inner sleeve and being spaced from said outer sleeve in order not to interfere with expansion of said inner sleeve by an inserted faucet.

5. A device of the class described, comprising a resilient soft rubber element having an inner relatively short faucet-receiving sleeve and an outer relatively long sleeve integrally connected at one end to an end of said inner sleeve, and spaced throughout from said inner sleeve, said inner sleeve having an inwardly projecting flange at the free end thereof, said inner sleeve having circumferentially spaced external ribs substantially throughout the length thereof, said ribs being of such cross-sectional form as to prevent buckling of said inner sleeve and being spaced from said outer sleeve in order not to interfere with expansion of said inner sleeve by an inserted faucet, a relatively rigid adapter embraced by the free end of said outer sleeve and interlocked therewith in a substantially circumferential tongue-and-groove relation, and an endless relatively rigid band encircling the tongue-and-groove portions and maintaining said portion of said free end under such compression that said portion of said free end is substantially rigid so that it cannot yield sufficiently to permit said adapter to be withdrawn from said free end.

CHARLES O. MOORE.